(12) United States Patent
Shan et al.

(10) Patent No.: US 11,132,313 B2
(45) Date of Patent: Sep. 28, 2021

(54) DATA CONVERSION CONTROL APPARATUS, MEMORY DEVICE AND MEMORY SYSTEM

(71) Applicant: MONTAGE TECHNOLOGY CO., LTD., Shanghai (CN)

(72) Inventors: Gang Shan, Shanghai (CN); Yi Li, Shanghai (CN); Howard Chonghe Yang, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/881,016

(22) Filed: May 22, 2020

(65) Prior Publication Data

US 2020/0371973 A1 Nov. 26, 2020

(30) Foreign Application Priority Data

May 22, 2019 (CN) .......................... 201910431354.4

(51) Int. Cl.
| | |
|---|---|
| G06F 13/16 | (2006.01) |
| G06F 13/38 | (2006.01) |
| G06F 13/40 | (2006.01) |
| G06F 13/42 | (2006.01) |
| G06F 21/78 | (2013.01) |
| G06F 11/10 | (2006.01) |

(52) U.S. Cl.
CPC ...... *G06F 13/1694* (2013.01); *G06F 11/1068* (2013.01); *G06F 11/1092* (2013.01); *G06F 13/387* (2013.01); *G06F 13/4282* (2013.01); *G06F 21/78* (2013.01)

(58) Field of Classification Search
CPC . G06F 13/1694; G06F 13/387; G06F 13/4027
See application file for complete search history.

(56) References Cited

U.S. PATENT DOCUMENTS

| | | | |
|---|---|---|---|
| 8,612,713 B2 * | 12/2013 | Kim ................... | G06F 13/1657 711/170 |
| 2007/0162670 A1 * | 7/2007 | Yang .................... | G11C 29/02 710/100 |

(Continued)

*Primary Examiner* — David E Martinez
(74) *Attorney, Agent, or Firm* — Jun He Law Offices P.C.; James J. Zhu (57) ABSTRACT

A data conversion control apparatus, comprising: at least one first interface each for coupling a first external interface, both of the first interface and the first external interface being in accordance with a predetermined physical interface standard, wherein data transmitted between the first interface and the first external interface is in accordance with a configurable application layer protocol; at least one second interface each for coupling a second external interface, wherein the second external interface is a memory interface in accordance with a predetermined memory interface standard, and the second interface is configurable to match the predetermined memory interface standard; and a data rebuild unit coupled between the at least one first interface and the at least one second interface, wherein the data rebuild unit is configured to rebuild data such that data can be transmitted in respective formats between the at least one first interface and the at least one second interface.

12 Claims, 3 Drawing Sheets

(56) References Cited

U.S. PATENT DOCUMENTS

2008/0091888 A1\* 4/2008 Sandy ................. G06F 13/4234
711/154
2009/0027844 A1\* 1/2009 Chen ..................... G06F 13/409
361/679.31
2017/0255574 A1\* 9/2017 Choi ................... G06F 13/4063

\* cited by examiner

DATA CONVERSION CONTROL APPARATUS, MEMORY DEVICE AND MEMORY SYSTEM

CROSS REFERENCE TO RELATED APPLICATIONS

This application is based on and claims priority to Chinese Patent Application No. 201910431354.4 filed on May 22, 2019, the entire content of which is incorporated herein by reference.

TECHNICAL FIELD

The application generally relates to data transmission and memory technologies, and more particularly to a data conversion control apparatus, a memory device having such data conversion control apparatus, and a memory system.

BACKGROUND

In conventional computer systems, a memory module needs to exchange data with a central processing unit ("CPU") via a specific memory interface, limiting the expandability of the computer systems. In addition, for a conventional memory system having multiple memory modules, the memory modules cannot bypass the CPU to exchange data with each other directly, thereby lowering the efficiency of data communication.

Thus, there is a need to improve the conventional memory systems and computer systems.

SUMMARY

An objective of the present application is to provide a data conversion control apparatus and a memory system using such apparatus, to resolve the problem that the conventional memory systems are poor in expandability.

Another objective of the present application is to provide a data conversion control apparatus, to resolve the problem that conventional computer systems require host devices to implement data communication between multiple memories which is low in efficiency.

The aspects and embodiments of the present application at least resolve one of the objectives above.

According to an aspect of the present application, a data conversion control apparatus comprising: at least one first interface each for coupling a first external interface, both of the first interface and the first external interface being in accordance with a predetermined physical interface standard, wherein data transmitted between the first interface and the first external interface is in accordance with a configurable application layer protocol; at least one second interface each for coupling a second external interface, wherein the second external interface is a memory interface in accordance with a predetermined memory interface standard, and the second interface is configurable to match the predetermined memory interface standard; and a data rebuild unit coupled between the at least one first interface and the at least one second interface, wherein the data rebuild unit is configured to rebuild data such that data can be transmitted in respective formats between the at least one first interface and the at least one second interface.

In some embodiments, the predetermined physical interface standard is a serial interface standard.

In some embodiments, the data rebuild unit is further configured to perform at least one of the following processing: data reorganization, data correction, data encryption, data decryption, data scrambling, data descrambling, data tagging and data identification.

In some embodiments, the data rebuild unit is configurable.

In some embodiments, the at least one second interface is configurable with different memory interface standards to match the second external interface coupled thereto.

In some embodiments, the apparatus further comprises a configuration interface for receiving configuration data to configure to the data conversion control apparatus.

In some embodiments, the apparatus further comprises: a configuration interface for receiving configuration data to configure to the data conversion control apparatus.

In some embodiments, the second external interface is a memory interface of a predetermined memory with data computing functionality.

In some embodiments, the apparatus further comprises: at least one auxiliary interface coupled to the first interface or the data rebuild unit, each of the at least one auxiliary interface being for coupling an auxiliary interface of an additional data conversion control apparatus to exchange data between the data conversion control apparatus and the additional data conversion control apparatus.

In another aspect of the present application, a memory device comprises the data conversion control apparatus according to any of the preceding aspect, and at least one memory coupled to the at least one second interface respectively.

In a further aspect of the present application, a memory system comprising a plurality of memory devices coupled together, wherein each of the plurality of memory devices comprises: at least one memory each having a memory interface in accordance with a memory interface standard; at least one first interface each for coupling a first external interface, both of the first interface and the first external interface being in accordance with a predetermined physical interface standard, wherein data transmitted between the first interface and the first external interface is in accordance with a configurable application layer protocol; at least one second interface each for coupling a memory interface of a memory, wherein the second external interface is in accordance with a memory interface standard of the memory coupled thereto; a data rebuild unit coupled between the at least one first interface and the at least one second interface, wherein the data rebuild unit is configured to rebuild data such that data can be transmitted in respective formats between the at least one first interface and the at least one second interface; and at least two auxiliary interfaces coupled to the first interface or the data rebuild unit, and for coupling respective auxiliary interfaces of additional memory devices to exchange data between the memory device and the additional memory devices.

The foregoing is a summary of the present application, may be simplified or generalized, and some details may be omitted. Thus, it should be appreciated by those skilled in the art that this part is only exemplary and illustrative, but is not intended to limit the scope of the present application in any ways. This summary part is neither intended to determine the key features or necessary features of the subject sought to be protected, nor intended to be used as a supplementary means for determining the scope of the subject sought to be protected.

BRIEF DESCRIPTION OF THE DRAWINGS

The aforementioned features and other features of the present application will be fully understood via the following specification and the appended claims in combination with the accompanying drawings. It can be understood that, these accompanying drawings merely illustrate certain embodiments in accordance with the present application and should not be considered as limitation to the scope of the present application. By using the accompanying drawings, the content of the present application will be described more explicitly and detailedly.

DETAILED DESCRIPTION

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without departing from the spirit and scope of the application. It can be understood that, the various aspects of the application described and graphically presented herein may be arranged, replaced, combined, divided and designed in many different configurations, and these different configurations are explicitly incorporated in the application.

Figure 1:
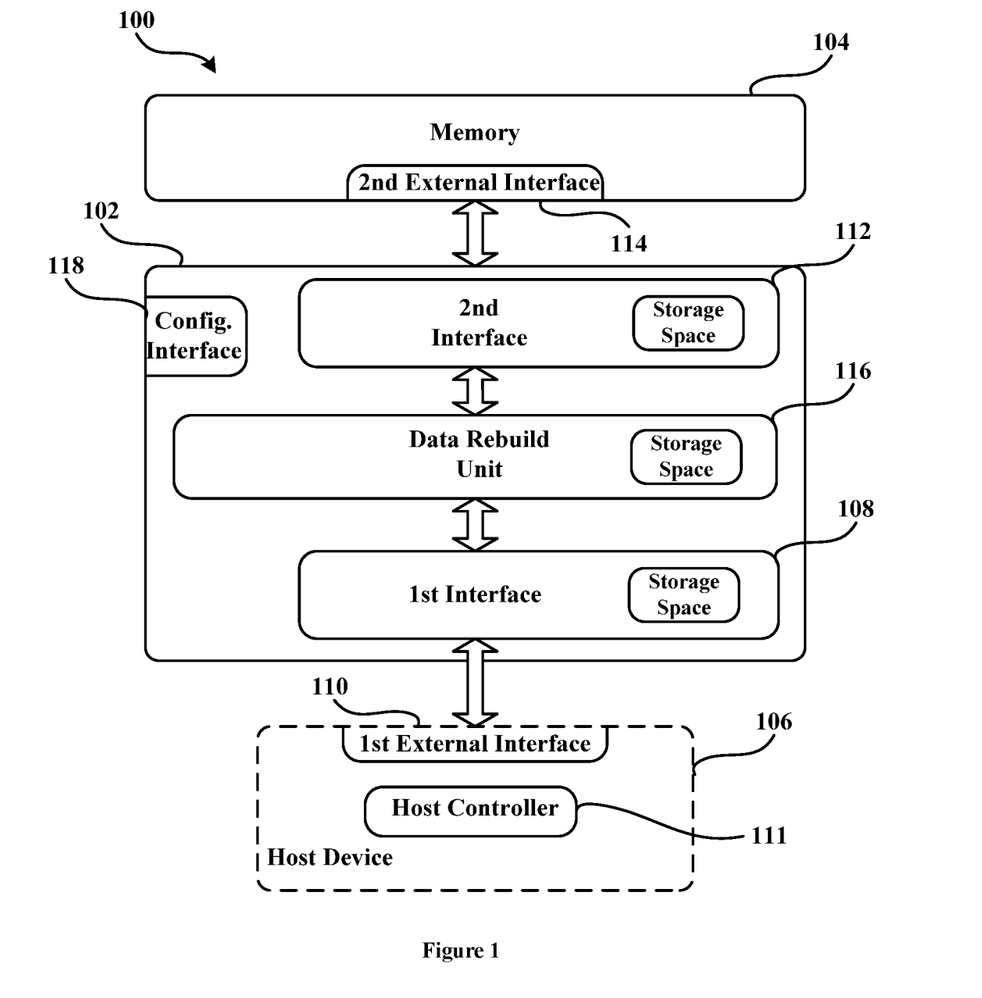
FIG. 1 shows a memory device 100 according to an embodiment of the present application.

FIG. 1 shows a memory device 100 according to an embodiment of the present application.

As shown in FIG. 1, the memory device 100 has a data conversion control apparatus 102 and a memory 104. The data conversion control apparatus 102 is configured to couple the memory 104 to a host device 106.

In some embodiments, the memory 104 may be a memory module in accordance with the JEDEC Double Data Rate (DDR) Synchronous Dynamic Random Access Memory (SDRAM) standard, including, for example, the JEDEC DDR, DDR2, DDR3, DDR4, DDR5 and other DDR standards. Moreover, the memory 104 can be an internal memory in accordance with other standards or protocols, e.g. a SDRAM or RAIVIBUS internal memory, or any other memories in accordance with future memory standards or protocols.

In some embodiments, the memory 104 may have one or more memory units for data storage. In some embodiments, the memory units may include a volatile memory (e.g., random access memory, RAM), a non-volatile memory (e.g., a flash memory such as NAND or NOR flash memory) or a combination thereof. In some other embodiments, the memory units may be new types of memories manufactured using other processes, including but not limited to, a magnetoresistive memory, a phase change memory, a resistive memory, a semi-floating gate memory or any other types of memories. It can be appreciated that the memory units herein can be a memory chip of a single die or a memory chip of two or more dies.

In some embodiments, the memory 104 may further include a memory controller having a registering clock driver and data buffers (not shown). Specifically, the registering clock driver is coupled to the memory units and can receive a data access command containing an access address and an access type. For example, the data access command may be a command of accessing (e.g., reading or writing) one or more data storing addresses (i.e., the access address) in the memory units. In some embodiments, the registering clock driver receives the data access command via a command/address (CA) bus. After receiving the data access command, the registering clock driver processes and analyzes the data access command and provides it to the memory units. Moreover, the registering clock driver further processes the data access command to generate an operation command such as a read command or write command, and provide such operation command to the data buffers. For example, the operation command can be transmitted via a data buffer control bus (e.g. a BCOM bus) between the registering clock driver and the data buffers. In some embodiments, multiple data buffers are coupled to the registering clock driver respectively, and each data buffer is coupled to a corresponding memory unit via a memory unit data interface. Accordingly, the data buffers can buffer the data exchanged between the memory units and an external device external to the memory device 100 under the control of the registering clock driver.

Still referring to FIG. 1, the data conversion control apparatus 102 includes a first interface 108 for coupling a first external interface 110 of the host device 106. Both of the first interface 108 and the first external interface 110 are in accordance with a predetermined physical interface standard to connect with each other. The predetermined physical interface standard can be, for example, Peripheral Component Interconnect (PCI) standard, Peripheral Component Interconnect express (PCIe) standard (including PCIe Gen1, PCIe Gen2, PCIe Gen3, PCIe Gen4 and future PCIe standards), Cache Coherent Interconnect for Accelerators (CCIX) standard, Compute Express Link (CXL) standard, Generation Z (Gen-Z) standard, or Universal Serial Bus (USB) standard, etc. It can be appreciated, in some embodiments, the first interface 108 and the first external interface 110 can be other types of physical interfaces, such as physical interfaces in accordance with other serial interface standards.

The host device 106 further includes a host controller 111 which may be a CPU or a microcontroller, for example. Under the control of the host controller 111, the host device 106 can transmit data to the memory device 100 via the first external interface 110, or receive data from the memory device 100 via the first external interface 110.

In order for data transmission, data communication between the first interface 108 and the first external interface 110 needs to be in accordance with the predetermined physical interface standard. Moreover, data transmitted between the two interfaces needs to be in accordance with specific application layer protocols. For example, the first interface 108 may be configured according to a specific application layer protocol, such that it can parse data transmitted from the first external interface 110 and encoded in accordance with the same application layer protocol, or it can encode data in accordance with the specific application layer protocol and transmit the encoded data to the first external interface 110.

The data conversion control apparatus 102 further includes a configuration interface 118, which can receive configuration data for configuring the application layer protocol to be used in the first interface 108. The configuration data can be stored in a storage space of the first interface 108, for example. The storage space may be a programmable logic array. In some embodiments, the configuration interface 118 may be a low-speed interface such as a SMBus interface or other I²C interfaces. The configuration data may be written into the first interface 108 before a normal operation of the data conversion control apparatus 102, and be used to initialize the data conversion control apparatus 102 when it is powered on. It can be appreciated that, in some embodiments, the first interface 108 may be configured with different application layer protocols depending on different data transmission requirements, thereby improving the flexibility of data exchange between the memory device 100 and the host device 106.

Still referring to FIG. 1, the data conversion control apparatus 102 further includes a second interface 112 for coupling the memory 104, and specifically coupling a second external interface 114 of the memory 104. It can be appreciated that, in practical applications, different memory devices may be coupled to different types of memories which are in accordance with respective memory interface standards such as the DDR4 standard and the DDR5 standard. Accordingly, the second interface 112 may be configurable to match the predetermined memory interface standard used by the second external interface 114 of the memory 104. In some embodiments, from hardware perspective, the second interface 112 may have pins whose number and arrangement satisfy the connection with the second external interface 114, and the second interface 112 may have additional pins and/or modifiable interface mechanical structure (e.g. interface converters can be provided). From software perspective, similar to the first interface 108, the second interface 112 may receive configuration data for configuring the second interface 112, such that it can satisfy the software/data format requirements of the corresponding memory interface standards. The configuration data can be stored in a storage space of the second interface 112. In this way, the data conversion control apparatus 102 can be provided and configured as a general purpose component which can be configured in practical applications depending on what specific memory interface it is connected with, thereby further improving the compatibility and flexibility of the data conversion control apparatus 102.

It can be seen that the first interface 108 and the second interface 112 are different data transmission interfaces. In order to transmit data in different formats between the first interface 108 and the second interface 112, the data conversion control apparatus 102 further includes a data rebuild unit 112, which is coupled between the first interface 108 and the second interface 112 and for rebuilding data. Specifically, after the first interface 108 receives from the first external interface 110 data in a data format in accordance with an application layer protocol, the data rebuild unit 116 may reorganize the data to convert its data format to another data format in accordance with a memory interface standard, which may be a standard used by the second external interface 114 of the memory 104 the second interface 112 is actually coupled to. Then the data rebuild unit 116 provides the data in the converted format to the second interface 112, such that the second interface 112 can further transmit the data to the second external interface 114 of the memory 104 the second interface 112 is coupled to. Similarly, after the second interface 112 receives from the second external interface 114 data in a data format in accordance with the memory interface standard of the second external interface 114, the data rebuild unit 116 can reorganize the data to convert its data format to another data format in accordance with the application layer protocol used by the first interface 108, and further provides the data in the converted data format to the first interface 108. Accordingly, the first interface 108 can transmit the data to the first external interface 110 of the host device 106.

The data rebuild unit 116 can be implemented by hardware, software, firmware or the combination thereof. In some embodiments, the data rebuild unit 116 may be implemented as an application specific integrated circuit (ASIC) or a field programmable logic array (FPGA) chip. It can be appreciated that, the data rebuild unit 116 may include buffer(s) for buffering data received from the first interface 108 or the second interface 112, and the data rebuild unit 116 may perform data conversion on the buffered data. The data rebuild unit with buffers is specifically suitable for cases that the first interface 108 and the second interface 112 have mismatch in data transmission speed and/or timing.

In some embodiments, the data rebuild unit 116 may be configured with configuration data such that it may have different data processing capabilities. For example, the data rebuild unit 116 may be configured according to the configuration of the first interface 108 and the second interface 112. In some embodiments, the data rebuild unit 116 may be configured to have at least one of the following processing capabilities: data reorganization, data correction, data encryption, data decryption, data scrambling, data descrambling, data tagging and data identification. It can be appreciated that, data correction and/or data scrambling/descrambling can improve stability and reliability of the entire system. Data encryption/decryption can improve data security during transmission, and the encryption/decryption algorithm(s) can be selected by a user and then stored in the storage space of the data rebuild unit. With data tagging, data can be added with specific identifiers corresponding to various processes, such that the tagged data can be separately processed during transmission and subsequent processing/computing by the memory. With data identification, data can be tracked according to the identifiers carried thereon. In some embodiments, the data rebuild unit can provide additional control signal(s) to the second interface and instruct via the second interface the memory to separate different processes for computation during the subsequent computing.

It can be seen that the memory device 100 can be coupled to the interface of the host device 106 via the data conversion control apparatus 102, while it is not required that the interface of the host device 106 be certain type of memory interface, but can be serial interface or some other types of non-memory interfaces. In this manner, the memory device 100 can exchange data with the host device 106 which significantly improves the expandability of the memory device 100.

In some embodiments, the memory 104 can have data computation capability to compute on data received from the second interface 112 and return the computation results to the second interface 112. For more details of the memories having data computation capability, reference can be made to co-pending U.S. application Ser. Nos. 16/239,542 and 16/239,549 filed on Jan. 4, 2019 and Ser. No. 16/721,932 and 16/721,936 filed on Dec. 20, 2019, the entire contents of which are incorporated herein by reference.

It should be noted that only one first interface is shown in the embodiment of FIG. 1. In some other embodiments, the data conversion control apparatus 102 can have more first interfaces.

Figure 2:
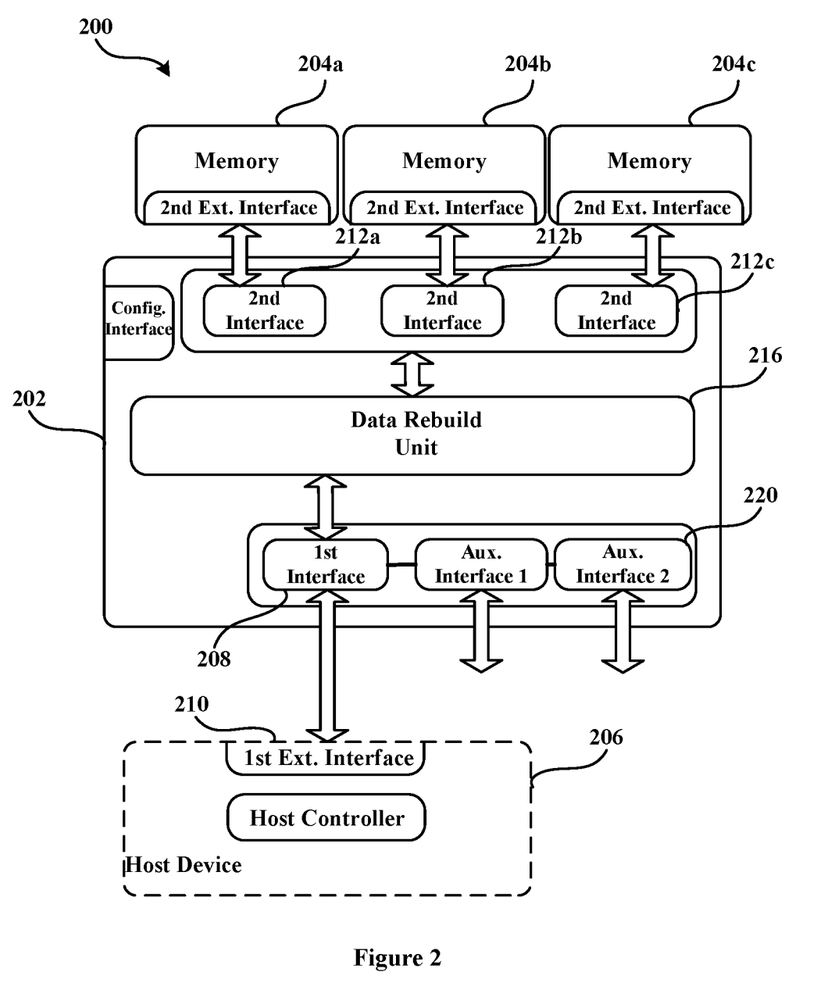
FIG. 2 shows a memory device 200 according to an embodiment of the present application.

FIG. 2 shows a memory device 200 according to an embodiment of the present application. Features of the memory device 200 which are the same as or similar to those of the memory device 100 shown in FIG. 1 will not be repeated herein. The other features and details of the memory device 200 which are different from those of the memory device 100 will be elaborated below.

As shown in FIG. 2, the memory device 200 includes a data conversion control apparatus 202 which couples three memories 204a, 204b and 204c to a host device 206.

Specifically, the data conversion control apparatus 202 can include three second interfaces 212a, 212b and 212c which are coupled to respective second external interfaces of the memories 204a, 204b and 204c to exchange data with them. The second external interfaces of the three memories can be compatible with respective memory interface standard(s), which can be either identical to or different from each other. In some embodiments, one or more of the three memories can have the same or different data computation capabilities, or can have no data computation capability. For example, the memory interface of the memory 204a can be compatible with the DDR4 standard, while the memory interfaces of the memories 204b and 204c can be compatible with the DDR5 standard. Since the data conversion control apparatus 202 can exchange data with these memories via different second interfaces, the data conversion control apparatus can communicate with the memories normally even they are in conformity with different memory interface standards. For another example, the memory interfaces of the memories 204b and 204c can both be compatible with the DDR5 standard but can work at different operation frequencies or rates, e.g. the memory 204b can work at 2133 MT/s while the memory 204c can work at 3200 MT/s. It can be appreciated that the data conversion control apparatus 202 can have other number of second interfaces to couple with respective memories in some embodiments.

Still referring to FIG. 2, the data conversion control apparatus 202 further includes a first interface 208 coupled to a first external interface of the host device 206. For more details of the first interface 208, reference can be made to relevant descriptions of the embodiment shown in FIG. 1.

The data conversion control apparatus 202 further include two auxiliary interfaces 220 (i.e. auxiliary interfaces 1 and 2). The auxiliary interfaces 220 can be compatible with standards such as PCI, PCIe, CCIX, CXL, Gen-Z, USB, etc. It can be appreciated that, similar to the first interface 208, the auxiliary interfaces 220 can be configured with configuration data to comply with different application protocols. The two auxiliary interfaces 220 are on the same side with the first interface 208 relative to a data rebuild unit 216. In some embodiments, the auxiliary interface 220 can be coupled to the data rebuild unit 216 via the first interface 208 to exchange data with the data rebuild unit 216 via the first interface 208. In some other embodiments, the auxiliary interface 220 can be coupled to the data rebuild unit 216 directly to exchange data there with. It can be appreciated that the data rebuild unit 216 can convert the format of data transmitted between the first interface 208 and the auxiliary interface 220.

Each auxiliary interface 220 is configured to couple with an auxiliary interface of another memory device, such that the memory device 200 can exchange data with other memory devices. These other memory devices can have the same or similar structures with the memory device 200. For example, these other memory devices may include data conversion control apparatuses with auxiliary interface(s), each of which may further has a first interface, a second interface and a data rebuild unit. In some embodiments, the memory device 200 may transmit out data received from one of its auxiliary interfaces via another one of its auxiliary interfaces, rather than process such data. In other words, data exchanged via the auxiliary interfaces may not be processed or stored by the data rebuild unit 216 or the memories 204a to 204c. In other embodiments, the memory device 200 may process data received via the auxiliary interface. For example, data received via auxiliary interface 1 may be converted by the data rebuild unit 216 and then provided to the memory 204a via the second interface 212a. After the data being processed by a computation unit integrated within the memory 204a, a computation result can be provided to the second interface 212a and further transmitted out via the auxiliary interface 220 after conversion by the data rebuild unit 216. In such manner, multiple memory devices can be serially coupled together via their respective auxiliary interfaces, which effectively implements data offloading and improves computation and processing capability of the memory system.

It can be appreciated that, in some embodiments, the data conversion control apparatus can include more auxiliary interfaces to couple with more memory devices. Accordingly, the expandability of the memory system is improved.

In some embodiments, each second interface can be configured with certain memory interface standard according to a memory that is coupled to the second interface, and each second interface can have a storage space for storing respective configuration data. In some other embodiments, multiple second interfaces can share a storage space for storing configuration data. Similarly, the first interface 208, the auxiliary interfaces 220 and the data rebuild unit 216 can have respective storage spaces or share a storage space to store configuration data.

Figure 3:
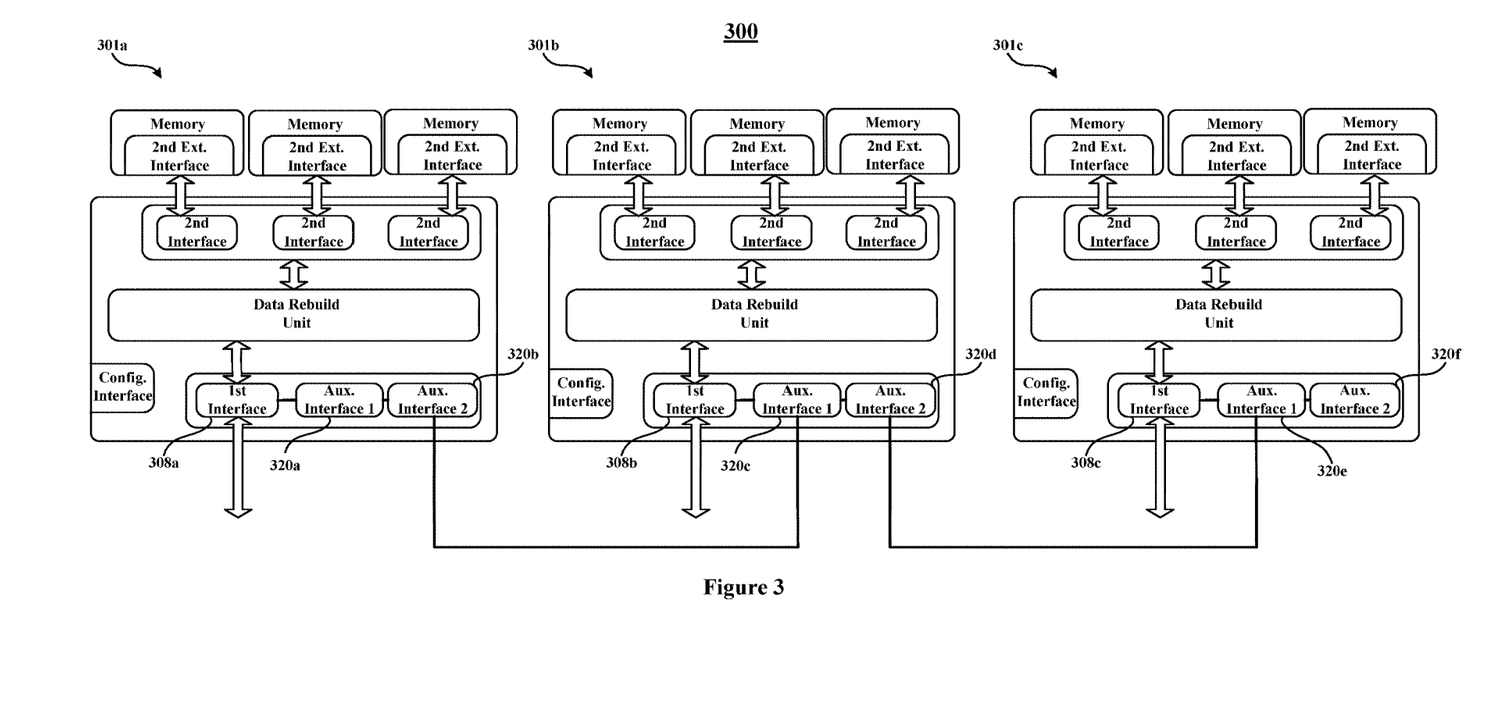
FIG. 3 shows a memory system 300 according to an embodiment of the present application.

FIG. 3 shows a memory system 300 according to an embodiment of the present application. Features of the memory device 300 which are the same as or similar to those of the memory device 100 shown in FIG. 1 or the memory device 200 shown in FIG. 2 will not be repeated herein. The other features and details of the memory device 300 which are different from those of the memory device 100 and the memory device 200 will be elaborated below.

As shown in FIG. 3, the memory system 300 includes three memory devices 301a, 301b and 301c which have first interfaces 308a, 308b and 308c respectively, to exchange data with a host device (not shown).

Moreover, the memory device 301a has auxiliary interfaces 320a (not coupled to other devices) and 320b, the memory device 301b has auxiliary interfaces 320c and 320d, and the memory device 301c has auxiliary interfaces 320e and 320f. The auxiliary interface 320b is coupled to the auxiliary interface 320c and the auxiliary interface 320d is coupled to the auxiliary interface 320e, thereby the memory devices 301a, 301b and 301c are coupled in series with each other. It can be appreciated that the auxiliary device 320b and the auxiliary interface 320c can have interface standards compatible with each other, while the auxiliary device 320d and the auxiliary interface 320e can have interface standards compatible with each other. However, the two pairs of auxiliary interfaces may have the same interface standard or different standards. It can be further appreciated that, similar to the first interface, the auxiliary interfaces 320a to 320f may all be configurable with configuration data to apply different application layer protocols.

It can be seen that, the memory device 301b can not only communicate with the host device via the first interface 308b but also communicate with adjacent memory devices via the auxiliary interfaces 320c and 320d, which improves the flexibility of the memory system in data computation. For example, the host device can send a first portion of data to the memory device 301a, a second portion of data to the memory device 301b and a third portion of data to the memory device 301c. Furthermore, the host device can further instruct the memory device 301a to send the processed first portion of data to the memory device 301b after processing it. Alternatively, the host device can instruct the memory device 301a to send the processed first portion of data to the memory device 301c directly without being processed by the memory device 301b. Accordingly, the memory device 301b or 301c can then process the first portion of data which has been processed by memory device 301a.

In some embodiments, the three memory devices 301a, 301b and 301c can have respective data computation capabilities based on different memories they have. For example, the memory device 301a can perform matrix multiplication on data using one or more weight matrices, the memory device 301b can perform matrix multiplication on data using one or more other weight matrices, and the memory device 301c can perform matrix multiplication and/or summation, and so on. In this way, a basic computation structure for a neural network can be formed using only the memory devices 301a to 301c. Moreover, the three memory devices 301a to 301c which are serially coupled with each other can work in a pipeline manner, improving the efficiency in data processing. In some embodiments, after processing, the memory device 301c can return to the host device the processing result via the first interface 308c.

In some embodiments, the data rebuild unit of each memory device can have data tagging and/or data recognition functions, to identify data for certain procedure(s), such as adding identifiers or recognize added identifiers. In this way, subsequent memory devices can select to process or not to process the identified data after receiving it.

In the embodiment with reference to FIG. 3, it is exemplarily described based on that the memories of the memory devices have data computation capability. In some embodiments, the memories can have no data computation capability and only be used for data storage. It can be appreciated that, by using the first interface coupled to the host device and the auxiliary interfaces for coupling with other memory devices, the memory system shown in FIG. 3 can flexibly distribute and transfer data to be stored.

It should be noted that, the embodiment shown in FIG. 3 only shows three memory devices coupled serially, while in some other embodiments the memory system can include more memory devices each of which can be coupled to the other memory devices either in series or in parallel therewith (depending on the number of auxiliary interfaces each memory device has). It should be further noted that, in the embodiment shown in FIG. 3, each memory device has three second interfaces to couple with different memory devices, while in other embodiments, each memory device can have other number of second interfaces such as including only one first interface or more second interfaces each of which can be coupled to or not be coupled to respective memories.

Although not shown in FIG. 3, similar to the embodiments shown in FIGS. 1 and 2, the first interfaces, the second interfaces, the auxiliary interfaces and the data rebuild units of all the data conversion control apparatus shown in FIG. 3 can have respective storage space or share the same storage space for storing configuration data. The configuration data can be written into the data conversion control apparatus via an additional configuration interface (not shown).

It can be appreciated that the memory systems of the embodiments of the present application can be used in various computer systems.

It should be noted that, although various modules or sub-modules of data conversion control apparatuses, memory devices and memory systems are mentioned in the forgoing detailed description, such division is merely exemplary but not mandatory. In fact, according to the embodiments of the application, features and functions of two or more modules described above can be specified in one module. On the contrary, features and functions of one module described above can be further divided into multiple modules to be specified.

Those skilled in the art may understand and implement other variations to the disclosed embodiments from a study of the drawings, the disclosure, and the appended claims. In the claims, the terms "comprise" or "comprising" do not exclude other elements or steps, and the terms "a" or "an" do not exclude a plurality. In practical applications according to the present application, one element may perform functions of several technical features recited in claims. Any reference symbols in the claims should not be construed as limiting the scope.

What is claimed is:

1. A data conversion control apparatus, comprising:
    at least one first interface each for coupling a first external interface, both of the first interface and the first external interface being in accordance with a predetermined physical interface standard, wherein data transmitted between the first interface and the first external interface is in accordance with a configurable application layer protocol;
    at least one second interface each for coupling a second external interface, wherein the second external interface is a memory interface in accordance with a predetermined memory interface standard, and the second interface is configurable to match the predetermined memory interface standard; and
    a data rebuild unit coupled between the at least one first interface and the at least one second interface, wherein the data rebuild unit is configured to rebuild data such that data can be transmitted in respective formats between the at least one first interface and the at least one second interface;
    a configuration interface for receiving configuration data for configuring, depending on a data transmission requirement for the first interface, the application layer protocol to be used in the first interface.

2. The apparatus of claim 1, wherein the predetermined physical interface standard is a serial interface standard.

3. The apparatus of claim 1, wherein the data rebuild unit is further configured to perform at least one of the following processing capabilities: data reorganization, data correction, data encryption, data decryption, data scrambling, data descrambling, data tagging and data identification.

4. The apparatus of claim 3, wherein the data rebuild unit is configurable.

5. The apparatus of claim 1, wherein the at least one second interface is configurable with different memory interface standards to match the second external interface coupled thereto.

6. The apparatus of claim 1, wherein the second external interface is a memory interface of a predetermined memory with data computing functionality.

7. The apparatus of claim 1, further comprising:
    at least one auxiliary interface coupled to the first interface or the data rebuild unit, each of the at least one auxiliary interface being for coupling an auxiliary interface of an additional data conversion control apparatus to exchange data between the data conversion control apparatus and the additional data conversion control apparatus.

8. The apparatus of claim 7, wherein the at least one auxiliary interface comprise a first auxiliary interface and a second auxiliary interface, wherein the first auxiliary interface is coupled to an auxiliary interface of a first additional data conversion control apparatus, and the second auxiliary interface is coupled to an auxiliary interface of a second additional data conversion control apparatus.

9. A memory device, comprising:
a data conversion control apparatus, comprising:
   at least one first interface each for coupling a first external interface, both of the first interface and the first external interface being in accordance with a predetermined physical interface standard, wherein data transmitted between the first interface and the first external interface is in accordance with a configurable application layer protocol;
   at least one second interface each for coupling a second external interface, wherein the second external interface is a memory interface in accordance with a predetermined memory interface standard, and the second interface is configurable to match the predetermined memory interface standard; and
   a data rebuild unit coupled between the at least one first interface and the at least one second interface, wherein the data rebuild unit is configured to rebuild data such that data can be transmitted in respective formats between the at least one first interface and the at least one second interface;
   a configuration interface for receiving configuration data for configuring, depending on a data transmission requirement for the first interface, the application layer protocol to be used in the first interface; and
at least one memory coupled to the at least one second interface, respectively.

10. A memory system comprising a plurality of memory devices coupled together, wherein each of the plurality of memory devices comprises:

at least one memory each having a memory interface in accordance with a memory interface standard;
at least one first interface each for coupling a first external interface, both of the first interface and the first external interface being in accordance with a predetermined physical interface standard, wherein data transmitted between the first interface and the first external interface is in accordance with a configurable application layer protocol;
at least one second interface each for coupling a memory interface of a memory of the at least one memory, wherein the memory interface is in accordance with a memory interface standard of the memory coupled thereto;
a data rebuild unit coupled between the at least one first interface and the at least one second interface, wherein the data rebuild unit is configured to rebuild data such that data can be transmitted in respective formats between the at least one first interface and the at least one second interface;
a configuration interface for receiving configuration data for configuring, depending on a data transmission requirement for the first interface, the application layer protocol to be used in the first interface; and
at least two auxiliary interfaces coupled to the first interface or the data rebuild unit, and for coupling respective auxiliary interfaces of additional memory devices to exchange data between the memory device and the additional memory devices.

11. The memory system of claim 10, wherein at least one memory of each of the plurality of memory devices has data computing functionality.

12. The memory system of claim 11, wherein the plurality of memory devices are serially coupled together, and at least one memory of each of the plurality of memory devices has respective data computing functionality.

* * * * *